US008061052B2

(12) United States Patent
Song et al.

(10) Patent No.: US 8,061,052 B2
(45) Date of Patent: Nov. 22, 2011

(54) S-SHAPE DETECTION TEST PIECE AND A DETECTION METHOD FOR DETECTING THE PRECISION OF THE NUMERICAL CONTROL MILLING MACHINE

(75) Inventors: Zhiyong Song, Chengdu (CN); Yawen Cui, Chengdu (CN)

(73) Assignee: Chengdu Aircraft Industrial (Group) Co., Ltd., Chendgu, Sichuan (CN)

( * ) Notice: Subject to any disclaimer, the term of this patent is extended or adjusted under 35 U.S.C. 154(b) by 191 days.

(21) Appl. No.: 12/523,062

(22) PCT Filed: Jan. 11, 2008

(86) PCT No.: PCT/CN2008/070087
§ 371 (c)(1),
(2), (4) Date: Jul. 14, 2009

(87) PCT Pub. No.: WO2008/086752
PCT Pub. Date: Jul. 24, 2008

(65) Prior Publication Data
US 2010/0004777 A1 Jan. 7, 2010

(30) Foreign Application Priority Data
Jan. 16, 2007 (CN) .......................... 2007 1 0048269

(51) Int. Cl.
*B23Q 17/00* (2006.01)
*G01B 3/30* (2006.01)
(52) U.S. Cl. ............... 33/502; 33/567; 33/1 BB; 33/546
(58) Field of Classification Search .................... 33/502, 33/503, 1 M, 1 BB, 545, 546, 567, 567.1; 73/1.01, 1.79, 1.81
See application file for complete search history.

(56) References Cited

U.S. PATENT DOCUMENTS

| 2,536,401 | A | * | 1/1951 | Victor | 33/567 |
| 4,662,074 | A | * | 5/1987 | Knapp et al. | 33/701 |
| 5,204,824 | A | * | 4/1993 | Fujimaki | 700/161 |
| 5,671,541 | A | * | 9/1997 | Dai et al. | 33/502 |
| 6,460,261 | B1 | * | 10/2002 | Noda et al. | 33/503 |
| 6,493,956 | B1 | * | 12/2002 | Matsuda | 33/502 |
| 6,513,253 | B2 | * | 2/2003 | Matsuda et al. | 33/502 |
| 6,833,163 | B1 | * | 12/2004 | Krenkel et al. | 427/380 |
| 7,197,834 | B2 | * | 4/2007 | Heimer | 33/502 |

FOREIGN PATENT DOCUMENTS

| CN | 1595318 A | 3/2005 |
| CN | 1696634 A | 11/2005 |
| CN | 101000285 A | 7/2007 |
| SU | 1266679 A1 | 10/1986 |
| SU | 1547971 A1 | 3/1990 |

* cited by examiner

*Primary Examiner* — Amy Cohen Johnson
(74) *Attorney, Agent, or Firm* — Mei & Mark LLP

(57) ABSTRACT

The present invention relates to an "S" shaped detection test piece for comprehensively detecting the precision of the numerical control milling machine and the detection method thereof. The detection test piece consists of an "S" shaped equal thickness edge strip (1) and a rectangular base (2), respectively forming two "S" shaped curves in two different planes and the projections of which in the base plane (3) cross each other and have open and close angle (α) states formed at the intersection. The tube vernier calipers is directly used in the detection method to measure the thickness of the "S" shaped edge strip (1) and analyze and decide the five-axis coordinated precision according to the thickness of the upper and lower parts and different areas of edge strip (1); and the RTCP function of machine tool, the validity of post-processing programs and the spatial motion precision of machine tool are further analyzed and decided according to smoothness of the tool path of the combining site of the detection base plane (3) and the edge strip (1) and smoothness of the edge strip profile.

11 Claims, 3 Drawing Sheets

US 8,061,052 B2

S-SHAPE DETECTION TEST PIECE AND A DETECTION METHOD FOR DETECTING THE PRECISION OF THE NUMERICAL CONTROL MILLING MACHINE

FIELD OF THE INVENTION

The present invention relates to a detection test piece for comprehensively detecting the precision of the numerical control milling machine, and more particularly to a test piece for detecting the precision of the five-axis machine tool of the five-axis numerical control milling machine, and the present invention further relates to a method for detecting the multi-axis coordinated precision of the five-axis numerical control milling machine using a detection test piece.

DESCRIPTION OF THE RELATED ART

Along with the development of modern manufacturing technology, it is a general trend that the enterprises adopt the numerical control equipments, especially the five-axis machining equipments which have a wide machining range and high machining precision and have been generally applied in recent years in China. The precision of the numerical control machine determines the machining precision of parts, and therefore the acceptance of precision is a key section in the acceptance of the machine tool. Only the simple, direct and single precision indexes are detected for the geometric precision, positioning precision and repositioning precision of the machine tool in the prior art. The ISO10791-2: 1998 standard is followed in the acceptance of the geometric precision and the VDI/DGQ3441 standard in the acceptances of the positioning precision and the repositioning precision. However, during the acceptance of the dynamic precision of machine tool, there are big differences in the results from different detection methods and there are also differences in the items that can be detected, due to influences of machine tool motion characteristic, numerical control interpolation operation, numerical control system function, post-processing programs and process characteristics of the machined parts, etc. The provision, definition, measurement and data processing for the detection indexes vary throughout the world, and the U.S. standard (NAS) is one common standard in the sample data introductions of various NC machines. NAS979 is a "Uniform Cutting Tests—NAS Series Metal Cutting Equipment Specifications" established by NASA in 1970s. It provides a standard method to detect the multi-axis coordinated precision of the five-axis numerical control milling machine under actual machining condition, and the test piece used in this method is called "NAS piece". The called "NAS piece" detects the dynamic precision of the machine tool according to indexes, generated by machining the frustum test piece, such as surface roughness, roundness, angle and dimensional precision, etc., which is a common method both in China and abroad for the acceptance for the dynamic precision of numerical control machine tool. At the present time for the acceptance of the dynamic precision carried out for the standard test piece of NAS979 adopted on the three-axis machine tool, the precision of the interpolation shaft in motion can be decided according to the roundness of the machined cylindrical surface, the dimensional precision and straightness of the four sides of the milled rhombus and the geometrical relationship. However, for the detection of the five-axis coordinated precision of the machine tool carried out for the frustum test piece of NAS979 adopted on the five-axis machine tool, a common method currently for detecting the dynamic precision of the five-axis machine tool is to evaluate the dynamic precision of the machine tool according to the roundness, angle, smooth finish and dimensional precision of the frustum, but the machine tools qualified by the detection of frustum "NAS piece" cannot correctly reflect the comprehensive precision of each motion part machined by multi-axis machine. Because it is found in the actual production that the five-axis machine tool qualified by the frustum "NAS piece" often has problems during the five-axis machining such as unsmooth machining profile and poor surface quality, or even over-cut in some special parts that injure and waste the parts. It is found by analyzing the frustum "NAS piece" detection method and the onsite parts failures that along with the development of numerical control technology and numerical control machines there are drawbacks of "NAS979 frustum test piece" in the acceptance of five-axis numerical control milling machine: the NAS979 frustum test piece is always in the open angle machining area during the machining, which can not reflect the characteristics of the machine tool in the conversion of open and close angle states and not completely examine the multi-axis coordinated precision, especially the new numerical control functions, for example, the machining precision of the RTCP (Remote Tool Center Point) reflecting the importance function of the five-axis machining can not be detected, neither can the validity of the post-processing programs, which makes lots of troubles to debug and maintain the machine tool.

SUMMARY

In order to solve the above problems existing in the "NAS979 frustum test piece" of the prior art, the present invention provides an "S" shaped detection test piece which can correctly reflect the comprehensive multi-axis machining dynamic precision, and the "S" shaped detection test piece cannot only conveniently and efficiently detect the five-axis machining dynamic precision of the machine tool, but also directly reflect the quality of the machining surface and the smoothness of the profile and preliminarily evaluate the equipment precisions and the post-processing programs.

Another object of the present invention is to provide a method for detecting the multi-axis coordinated precision of the five-axis numerical control milling machine using the present invention of "S" shaped detection test piece.

In order to resolve the technical issues, the present invention adopts a technical solution of an "S" shaped detection test piece for comprehensively detecting the precision of the numerical control milling machine and the detection method thereof, said test piece consists of an "S" shaped ruled surface equal thickness edge strip and a rectangular base, respectively forming two "S" shaped curves in two different planes and the projections of which in the base plane cross each other and have open and close angle states formed at the intersection, the motion path of the included angle between said ruled surface 6 and the base plane 3 along the "S" shaped line varies unevenly.

Another object of the present invention is to provide a method for comprehensively detecting the precision of the numerical control milling machine using said "S" shaped detection test piece.

Compared with the prior art, the present invention has beneficial effects as follows:

The present invention can detect the five-axis coordinated dynamic precision of the five-axis numerical control milling machine, and compared with the prior art of NAS piece, the collection and analysis of the experiment results are more convenient and direct, which better conforms to the actual machining environment. the strip thickness of the "S" test piece for detection of the precision of the machine tool using "S" test piece, and the five-axis coordinated precision of the machine tool can be analyzed and decided according to the thickness of the edge strip; and the preliminary evaluations on the equipment precision, post-processing programs and RTCP precision can be performed without any tools but according to smoothness of the edge strip profile and smoothness of the tool path of the combining site of the base plane and the edge strip. But the dynamic precision evaluation of the machine tool can only be performed after the detection of "NAS piece" by the special roundness measuring instrument and inclinometer.

The present invention of "S" piece can more fully detect the five-axis coordinated dynamic precision of the machine tool compared with the existing "NAS piece". The "S" piece, with machining features such as the varying included angle between the edge strip profile and the base plane, has an open angle machining area, a close angle machining area and an open-close transition machining area, which has more comprehensive precision detection compared with the "NAS piece" only having an open angle machining area and the fixed angle between the profile and the base plane; moreover, the open-close transition machining area and the machining features such as the varying included angle between the edge strip profile and the base plane have a very high requirement on the five-axis coordinated precision of the machine tool, and therefore the detection on the "S" piece is more strict than that on the NAS piece; the smoothness of edge strip profile of the "S" piece and the combining site of the base plane and the edge strip can reflect the validity of the post-processing programs and the RTCP precision, but the NAS piece cannot detect these items. During the installation or maintenance, many five-axis numerical control milling machines have problems such as unsmooth profile, bad surface quality and low geometrical precision of the parts when machining some parts after the diction of "NAS piece". It is proved by experiments that if the detected machine tool passes the test of the present invention of "S piece", the above problems will not happen when the above parts are machined.

DESCRIPTION OF THE DRAWINGS

The present invention will be further described with reference to the accompanying drawings and embodiments the scope of which however is not intended to limit the present invention.

DESCRIPTION OF THE PREFERRED EMBODIMENTS

Figure 1:
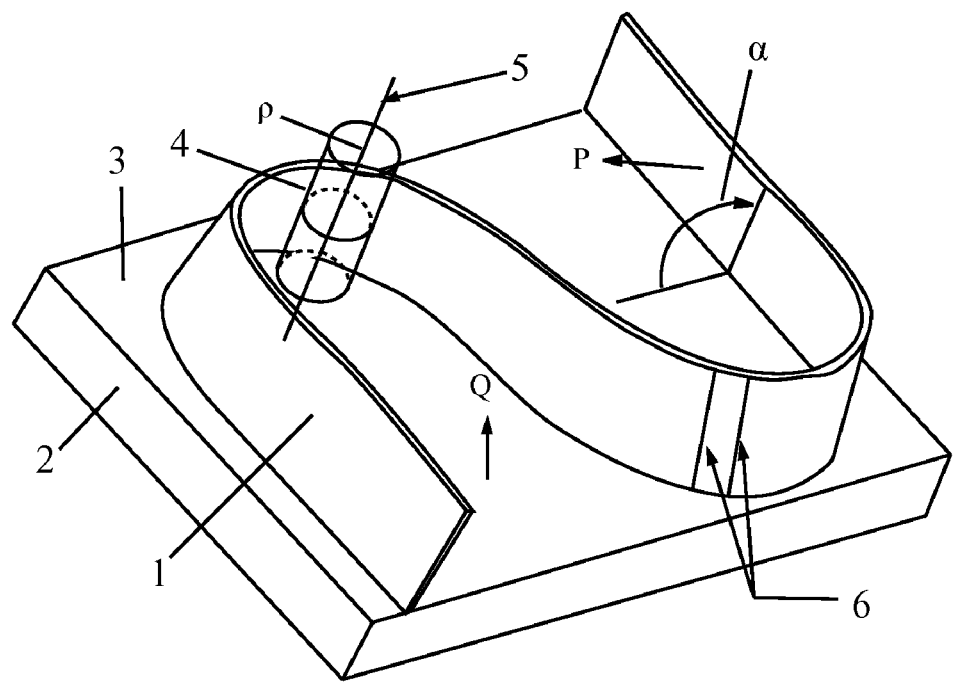
FIG. 1 is a schematic view of the three dimensional structure of the present invention.
Figure 2:
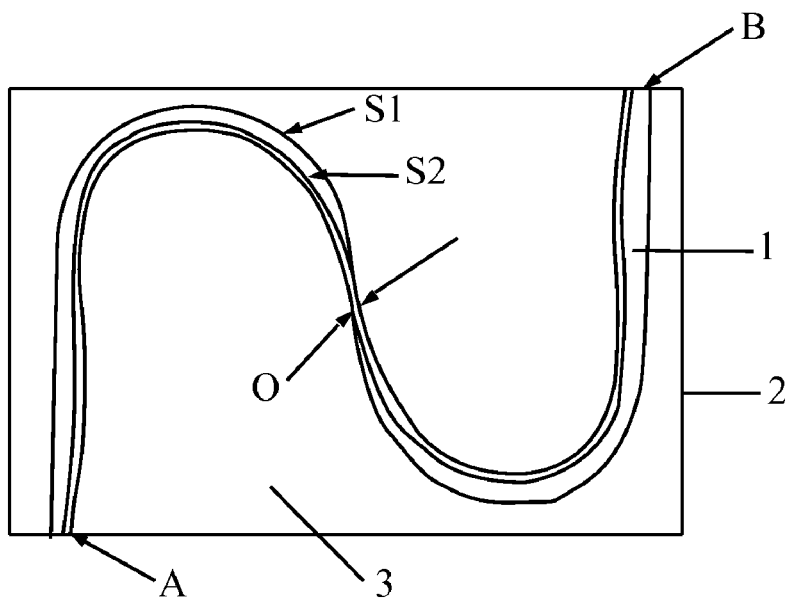
FIG. 2 is a top view of FIG. 1.
Figure 3:
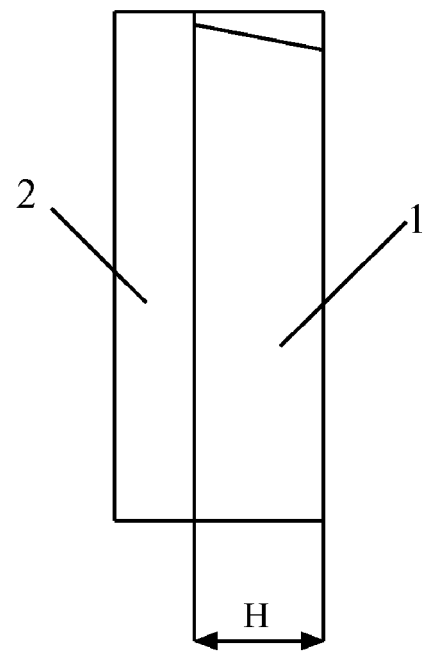
FIG. 3 is a side view of FIG. 1.

FIGS. 1, 2 and 3 describe the preferred embodiments of the present invention that adopt the "S" shaped detection test piece formed by the five-axis machining of the machine tool. Said test piece is machined by the five-axis machining of the numerical control machine tool, and it is required the peripheral teeth of the cutting tool 4 cut the test piece into an "S" shaped edge strip profile 1. The curve radius ρ at any one point on the "S" shaped edge strip profile 1 is larger than the radius R of the cutting tool 5. The normal direction P at any one point on the "S" shaped edge strip profile 1 is defined as the direction perpendicular to the profile and outside the edge strip, and the normal direction Q of the base plane 3 is defined as the upward direction perpendicular to the plane. The included angle between the base plane and the "S" shaped edge strip 1 is defined as the directed angle α ($0 \leq \alpha \leq 180°$) formed from the normal direction Q at any one point on the profile to the normal direction of the base plane 3, and the included angle with α<90° is defined as close angle while the included angle with α≧90° is defined as open angle. The "S" shaped edge strip is a ruled surface 6, and the ruled surface 6 is a spline curved surface formed by two spline curves. At any one point on the ruled surface 6, there is a straight line passing over, and one spline curve generating the ruled surface can reach another spline curve via this straight line. The "S" shaped test piece is obtained through the five-axis machining on the numerical control milling machine. The test piece consists of an "S" shaped ruled surface equal thickness edge strip profile 1 and a rectangular base 2, and said "S" shape is generated by two spatial "S" shaped curves respectively in two different planes, and the projections of the two "S" shaped curves cross each other in the base plane 2 and form the open and close angle states at the cross of two curves, and the motion path of the included angle between said ruled surface 6 and the base plane 3 along the "S" shaped line varies unevenly. The test piece has several main geometric features as follows:

A. Viewed from the top of the rectangular base plane 3, the edge strip profile 1 of the test piece presents an "S" shape. The edge strip profile 1 is a ruled surface 6.

B. The motion path of the included angle between said ruled surface 6 and the base plane 3 along the "S" shaped line varies unevenly, and has open and close angle states formed at the intersection. The upper and lower "S" shaped border lines of the "S" shaped edge strip profile in different planes have their projections s1 and s2 crossing each other in the base plane (see FIG. 2), allowing variation of the included angle α between open and close angle states. The close angle α, formed between the projection S1 of the path at the bottom of the inner profile in the edge strip path area between A and O of the "S" shaped line and the base plane 3, is less than 90°, and the open angle α, formed between the projection S1 of the path at the top of the outer profile in the edge strip path area between A and O of the "S" shaped line and the base plane 3, is not less than 90°, the edge strip path between A and O of the "S" shaped line converges the edge strip path between O and B at the point O which point O is a transition point for open and close angles, so that the included angle α formed between the profile in the path area between O and B and the base plane 3 is exactly contrary to the included angle of the edge strip path between A and O.

C. The include angle between the profile at any of the upper and lower sides and the base plane 3 has a transition area for open and close angles; said included angle α is in the range from 70° to 110°, the variation of which is uneven. The height of the edge strip follows 30 mm≦H≦50 mm.

Figure 4:
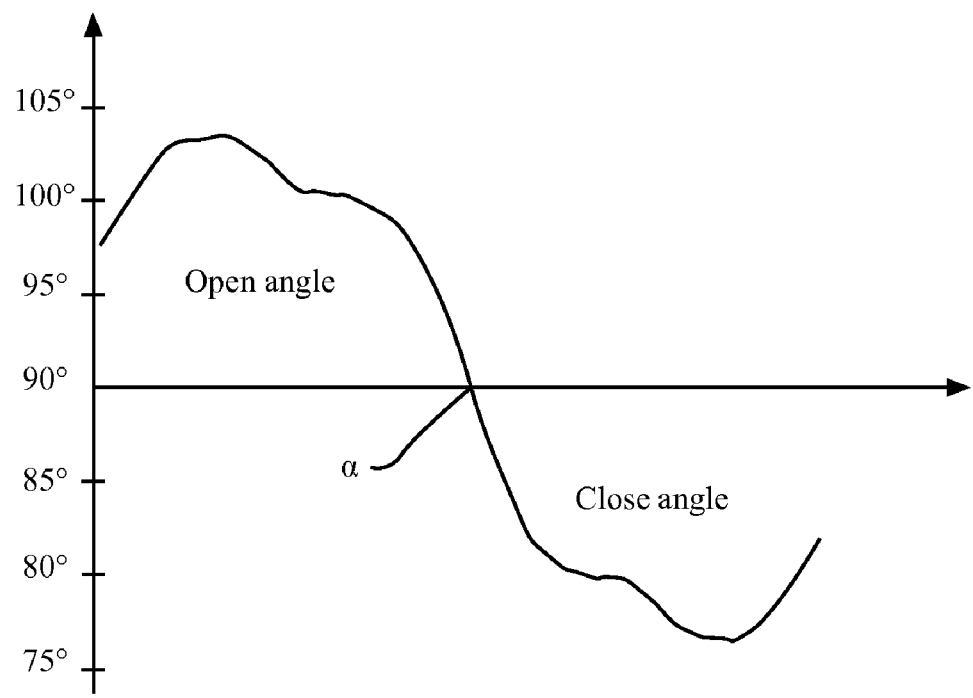
FIG. 4 is a schematic view illustrating variation of the included angle between the base plane and the edge strip profile of the present invention.

FIG. 4 describes a variation pattern that the cross of the two projection lines s1 and s2 of the upper and lower border lines of the "S" shaped edge strip on the base plane shown in FIG. 2 allows the included angle α to change in the transition area of open and close angles.

Figure 5:
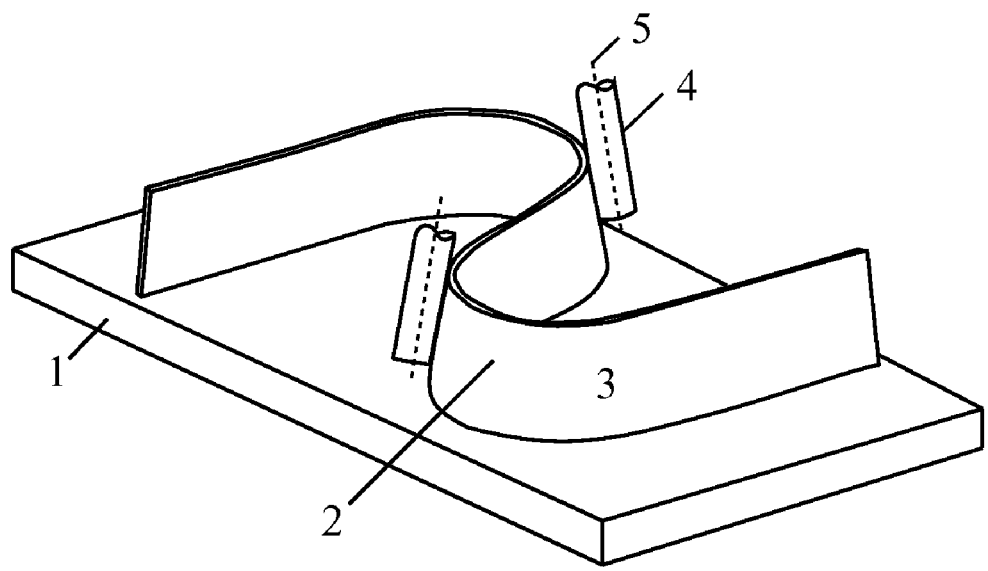
FIG. 5 is a schematic view illustrating the strike direction of the tool angle using the method of the present invention.
Figure 6:
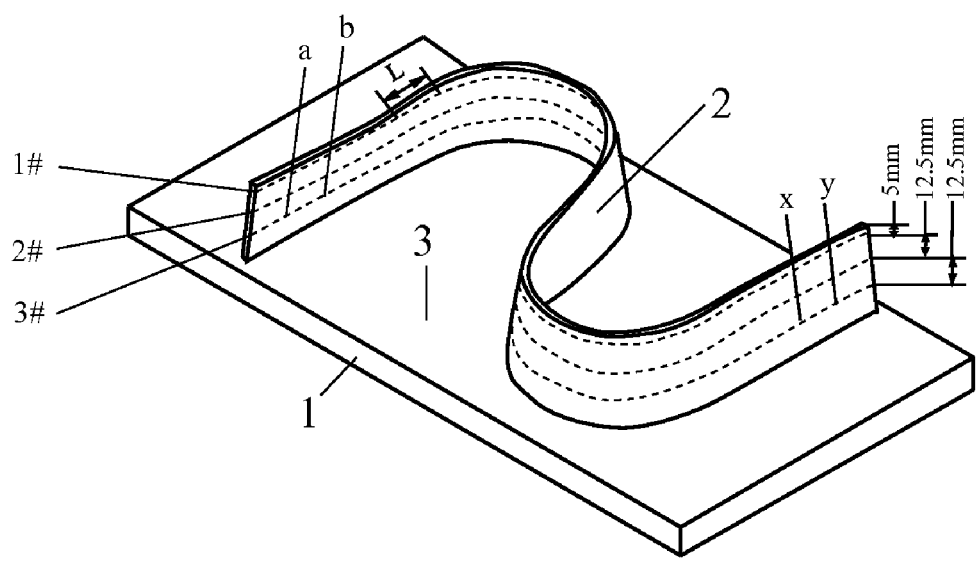
FIG. 6 is a schematic view for the machining using the method of the present invention.

FIGS. 5 and 6 describe a detection method for comprehensively detecting the precision of the numerical control milling machine using said "S" shaped test piece. The machine tool detected is a five-axis numerical control milling machine. The method includes the following steps: A. to produce a cuboid blank with overall dimension of 395 mm×195 mm×70 mm, working length≧60 mm, dimension of 20 mm and 2 teeth, a carbide tool and a right-handed machining tool; the material for the test piece is 7075-T7451 aluminum. The "S" shaped test piece is machined on the numerical control milling machine. B. during the machining, said blank piece is horizontally placed at the center of the five-axis numerical control milling machine to machine the "S" shaped test piece. C. during the machining, the peripheral teeth of the tool adhere to the "S" shaped edge strip profile which is cut into a rough machining "S" shaped edge strip profile by the peripheral teeth of the tool according to the preset numerical control programs; D. during the finish machining of the edge strip profile, it is required to cut layer by layer with 3-5 mm each layer along the axial direction of the tool, and it is required the "S" shaped edge strip profile be cut by the peripheral teeth of the tool during the machining. The finish machining for the rough machining "S" shaped edge strip is performed along the axial direction of the tool with 3-5 mm layer by layer cut for each layer from top to down (the rough and finish machining are the same). E. precision evaluation: after machining the test piece, the evaluation on the machining precision of the machine tool is carried out according to the indexes such as appearance of the edge strip profile, smooth degree of the tool path at the combining site of the base plane and the edge strip, surface smoothness of the edge strip profile, strip thickness and dimensional error, etc. To evaluate the five-axis dynamic precision, RTCP precision and validity of the post-processing programs, and the measuring results are recorded in the following test chart.

As shown in FIG. 6, three section lines, i.e. 1#, 2# and 3# lines in the figure. are taken along the height direction of the S shaped edge strip. The distance from 1# section line to the edge strip top is 5 mm in the height direction of the edge strip, and the interval of the section lines is 12.5 mm. 25 points are selected with an interval L on each S shaped section line, that is, a, b . . . x, y marked in FIG. 6, totally 75 points for the three section lines. 10 points are randomly picked in every section line, and the strip thickness at the sites of totally 30 points is measured by the tube vernier calipers; the dimensional error of all the 75 points is detected by the three dimensional measuring machine.

The measuring results are recorded in the following form:
1) feeding speed: _____, speed of main shaft _____;
2) appearance of edge stripe profile:
   smoothness: qualified☐ disqualified☐
   machined trace: no☐ yes☐ (number of trace: _____)
   injured trace: no☐ yes☐ (number of injury: _____)
3) tool path at the combining site of the base plane and the edge strip
   smoothness: qualified☐ disqualified☐
   machined trace: no☐ yes☐ (number of trace: _____)
   injured trace: no☐ yes☐ (number of injury: _____)
4) edge strip thickness
   Thickness (mm)
      1 2 3 4 5 6 7 8 9 10
   1#
   2#
   3#
   allowable value: 3 mm±0.05
   maximum error of actual value: _____ qualified☐ disqualified☐
5) smoothness of edge strip profile
   allowable value≦Ra3.2, actual maximum value: _____ qualified☐ disqualified☐
6) dimensional error of profile
   dimensional error (mm)
      a b c d e f g h i j k l m n o p q r s t u v w x y
   1#
   2#
   3#
   allowable value: ±0.1 mm
   maximum error of actual value: _____ qualified☐ disqualified☐

What is claimed is:

1. An "S" shaped detection test piece for comprehensively detecting a precision of a numerical control milling machine, characterized in that, said test piece consists of an "S" shaped ruled surface equal thickness edge strip and a rectangular base, respectively forming two "S" shaped curves in two different planes and projections of which in a base plane cross each other and have open and close angle states formed at an intersection, and a motion path of an included angle between said ruled surface and the base plane along the "S" shaped line varies unevenly.

2. The "S" shaped detection test piece according to claim 1, characterized in that, an edge strip path between point (A) and point (O) of an "S" shaped line converges the edge strip path between point (O) and point (B) at point (O) which point (O) is a transition point for open and close angles, so that an included angle ($\alpha$) formed between a profile in the path area between point (O) and point (B) and the base plane is exactly contrary to the included angle of the edge strip path between point (A) and point (O).

3. The "S" shaped detection test piece according to claim 1, characterized in that, a curve radius ($\rho$) at any one point on the "S" shaped edge strip profile is larger than a radius (R) of the cutting tool.

4. The "S" shaped detection test piece according to claim 1, characterized in that, a normal direction (Q) of the base plane is defined as an upward direction perpendicular to the base plane.

5. The "S" shaped detection test piece according to claim 1, characterized in that, a normal direction (P) at any one point on the "S" shaped edge strip profile is defined as a direction perpendicular to the profile and outside the edge strip.

6. The "S" shaped detection test piece according to claim 1, characterized in that, the included angle between the base plane and the "S" shaped edge strip is defined as a directed angle ($\alpha$) formed from a normal direction (Q) at any one point on the profile to a normal direction of the base plane, where ($0 \leq (\alpha) \leq 180°$).

7. The "S" shaped detection test piece according to claim 6, characterized in that, the included angle with ($\alpha$)<90° is defined as close angle while the included angle with ($\alpha$)≧90° is defined as open angle.

8. The "S" shaped detection test piece according to claim 6, characterized in that, said included angle ($\alpha$) varies unevenly in the range from 70° to 110°.

9. The "S" shaped detection test piece according to claim 1 or 2, characterized in that, a height (H) of said edge strip follows 30 mm≦(H)≦50 mm.

10. A detection method for comprehensively detecting a precision of a five-axis numerical control milling machine using an "S" shaped detection test piece comprising an "S" shaped ruled surface equal thickness edge strip and a rectangular base, respectively forming two "S" shaped curves in two different planes and projections of which in a base plane cross each other and have open and close angle states formed at an intersection, where a motion path of an included angle between said ruled surface and the base plane along the "S" shaped line varies unevenly, the method comprising the following steps:
- A. producing a cuboid blank and a cutting tool with a working length ≧60 mm;
- B. placing the blank horizontally on the five-axis numerical control milling machine to machine the "S" shaped test piece;
- C. sticking peripheral teeth of a cutting tool to the "S" shaped edge strip profile, during the machining, which is then cut into a rough machining "S" shaped edge strip profile by the peripheral teeth of the cutting tool according to preset numerical control programs;
- D. finishing the machining of the rough machining "S" shaped edge strip profile and cutting layer by layer with 3-5 mm each layer along an axial direction of the cutting tool;
- E. evaluating the machined "S" test piece for the five-axis dynamic precision of the machine tool, and evaluating Remote Tool Center Point (RTCP) precision and validity of the post-processing programs according to indexes comprising one or more of edge strip thickness, surface smoothness of the edge strip profile, and appearance of the edge strip profile, and recording measured results in a test chart; and
- F. selecting 25 points with an interval (L) on each "S" shaped section line, 75 points total for three section lines, randomly choosing 10 points in every section line, measuring a strip thickness using tube vernier calipers and detecting a dimensional error of all the detection points.

11. A detection method for comprehensively detecting a precision of a five-axis numerical control milling machine using an "S" shaped detection test piece comprising an "S" shaped ruled surface equal thickness edge strip and a rectangular base, respectively forming two "S" shaped curves in two different planes and projections of which in a base plane cross each other and have open and close angle states formed at an intersection, the method comprising the following steps:
- A. placing a cuboid blank horizontally on the five-axis numerical control milling machine to machine the "S" shaped detection test piece;
- B. sticking peripheral teeth of a cutting tool to the "S" shaped edge strip profile, during the machining, which is then cut into a rough machining "S" shaped edge strip profile by the peripheral teeth of the cutting tool according to preset numerical control programs;
- C. finishing the machining of the rough machining "S" shaped edge strip profile and cutting layer by layer along an axial direction of the cutting tool;
- D. evaluating the machined "S" test piece for the five-axis dynamic precision of the machine tool, and evaluating Remote Tool Center Point (RTCP) precision and validity of the post-processing programs; and
- E. selecting points with an interval (L) on each "S" shaped section line, randomly choosing points in every section line, and detecting a dimensional error of all the detection points.

* * * * *